(12) United States Patent
Kim et al.

(10) Patent No.: US 11,531,174 B2
(45) Date of Patent: Dec. 20, 2022

(54) CO-PACKAGING WITH SILICON PHOTONICS HYBRID PLANAR LIGHTWAVE CIRCUIT

(71) Applicant: Intel Corporation, Santa Clara, CA (US)

(72) Inventors: Sang Yup Kim, Sunnyvale, CA (US); Myung Jin Yim, San Jose, CA (US); Woosung Kim, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/642,671

(22) PCT Filed: Sep. 28, 2017

(86) PCT No.: PCT/US2017/054103
§ 371 (c)(1),
(2) Date: Feb. 27, 2020

(87) PCT Pub. No.: WO2019/066869
PCT Pub. Date: Apr. 4, 2019

(65) Prior Publication Data
US 2020/0200987 A1    Jun. 25, 2020

(51) Int. Cl.
*G02B 6/43*      (2006.01)
*G02B 6/122*   (2006.01)
(Continued)

(52) U.S. Cl.
CPC ............... *G02B 6/43* (2013.01); *G02B 6/122* (2013.01); *G02B 6/4212* (2013.01); *G02B 6/4274* (2013.01); *G02B 2006/12061* (2013.01)

(58) Field of Classification Search
None
See application file for complete search history.

(56) References Cited

U.S. PATENT DOCUMENTS 9,551,848 B1    1/2017  Dutta
9,715,064 B1 *  7/2017  Gambino ................. G02B 6/34
(Continued)

FOREIGN PATENT DOCUMENTS

JP       2010504571 A    2/2010
WO   WO-2019066869 A1  4/2019

OTHER PUBLICATIONS

"International Application Serial No. PCT/US2017/054103, International Search Report dated May 29, 2018", 5 pgs.
(Continued)

*Primary Examiner* — Michael Stahl
(74) *Attorney, Agent, or Firm* — Schwegman Lundberg & Woessner, P.A.

(57) ABSTRACT

An interposer apparatus for co-packaging an electronic integrated circuit and a photonic integrated circuit may include a dielectric substrate; an optical waveguide disposed on the dielectric substrate to optically couple the photonic integrated circuit disposed on one side of the dielectric substrate with at least one of another photonic integrated circuit disposed on the dielectric substrate or an optical device disposed on the dielectric substrate; and a metal interconnect disposed through the dielectric substrate to electrically couple the photonic integrated circuit disposed on the one side of the dielectric substrate with an electronic integrated circuit disposed on the other side of the dielectric substrate.

17 Claims, 8 Drawing Sheets

(51) Int. Cl.
    *G02B 6/42*     (2006.01)
    *G02B 6/12*     (2006.01)

(56)     References Cited

U.S. PATENT DOCUMENTS

| | | | |
|---|---|---|---|
| 2012/0224804 A1* | 9/2012 | Hashimoto | H01L 31/02325 385/14 |
| 2013/0230272 A1 | 9/2013 | Raj et al. | |
| 2014/0042463 A1 | 2/2014 | Uemura et al. | |
| 2014/0294342 A1* | 10/2014 | Offrein | G02B 6/43 385/14 |
| 2017/0102502 A1 | 4/2017 | Shibata et al. | |
| 2017/0199328 A1* | 7/2017 | Shubin | G02B 6/122 |
| 2018/0224601 A1* | 8/2018 | Low | H05K 1/144 |

OTHER PUBLICATIONS

"International Application Serial No. PCT/US2017/054103, Written Opinion dated May 29, 2018", 8 pgs.
"International Application Serial No. PCT US2017 054103, International Preliminary Report on Patentability mailed Apr. 9, 20", 10 pgs.

* cited by examiner

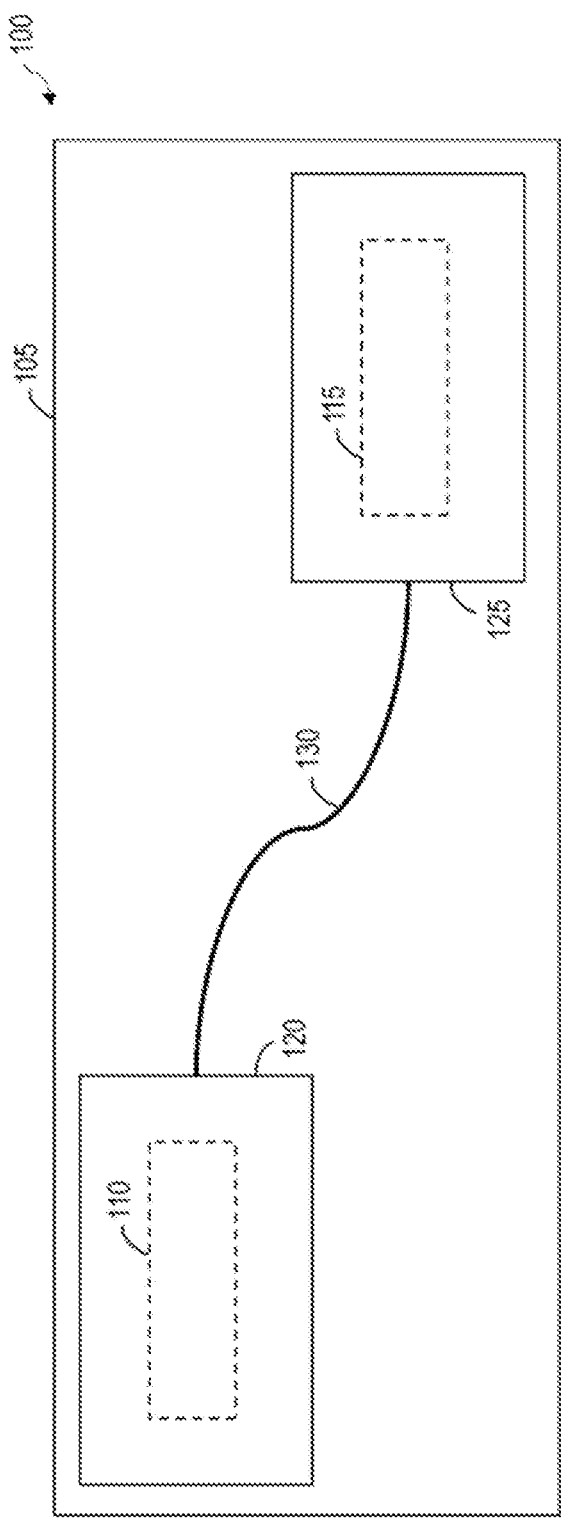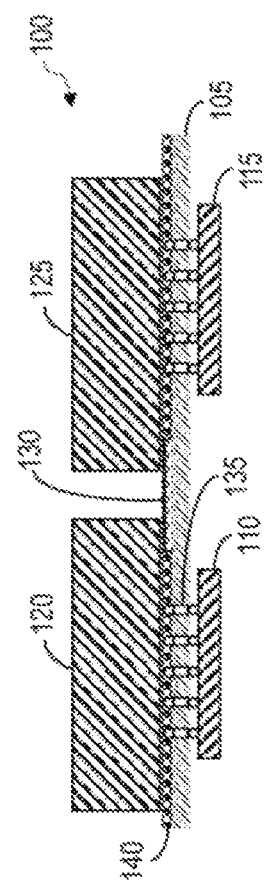

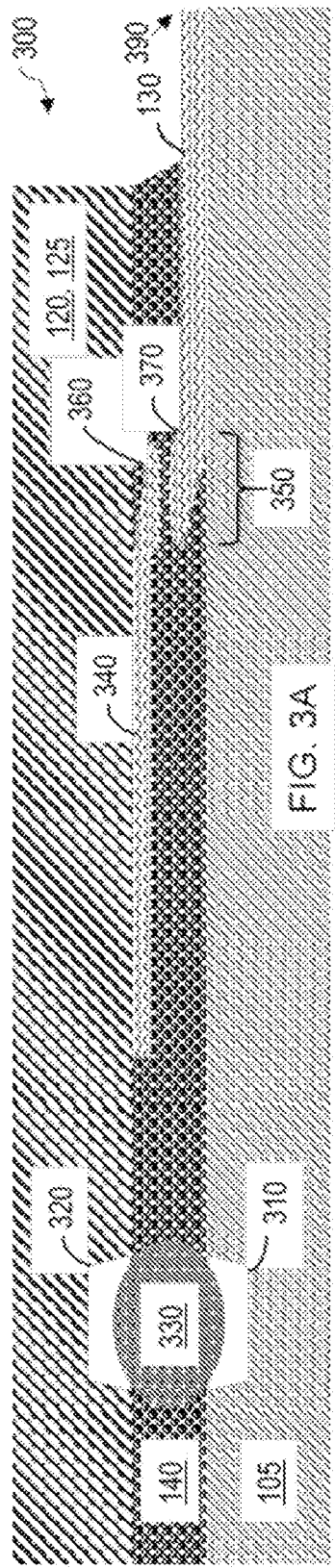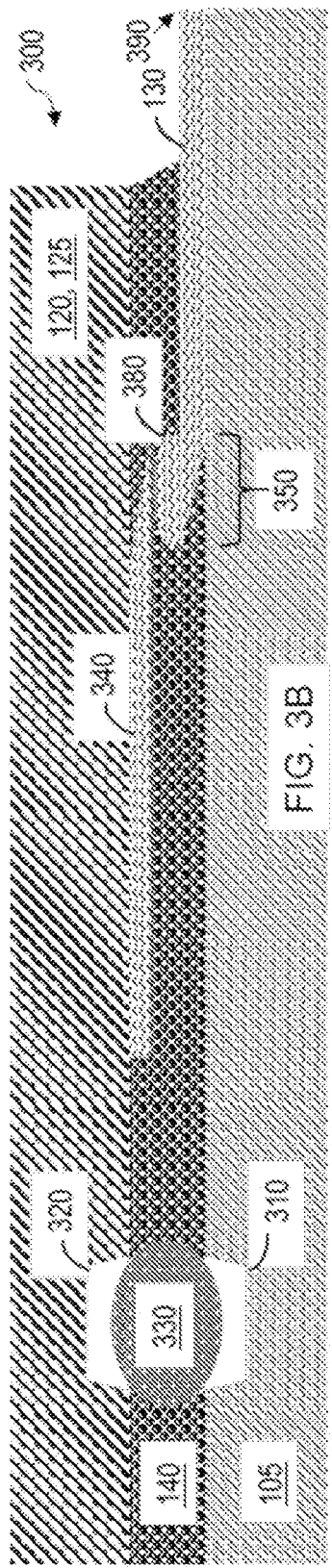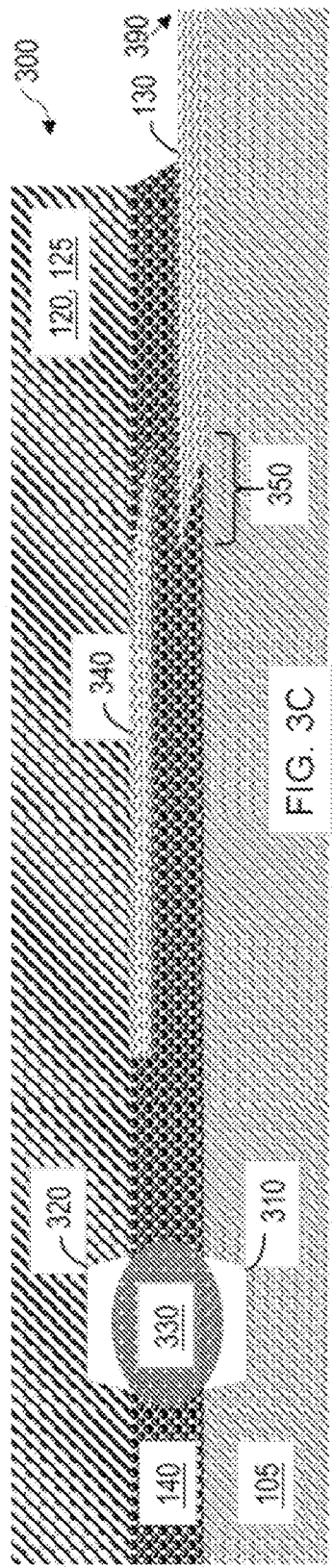

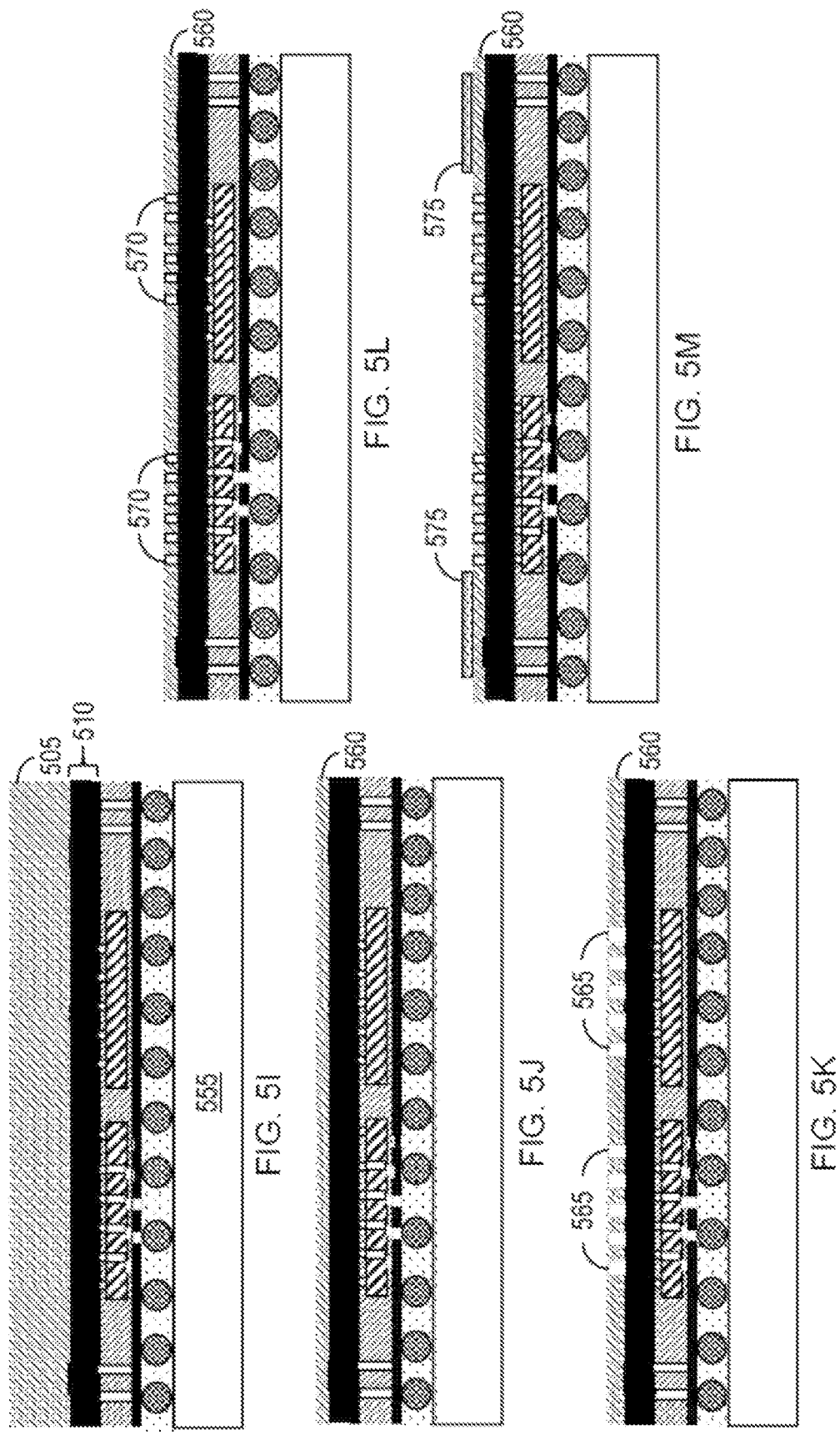

CO-PACKAGING WITH SILICON PHOTONICS HYBRID PLANAR LIGHTWAVE CIRCUIT

This application is a U.S. National Stage Filing under 35 U.S.C. 371 from International Application No. PCT/US2017/054103, filed Sep. 28, 2017 and published in English as WO 2019/066869 on Apr. 4, 2019, which is incorporated herein by reference in its entirety.

TECHNICAL FIELD

Embodiments pertain to hybrid integration of electronic integrated circuits and photonic integrated circuits using planar lightwave circuits, and in particular, co-packaging with a silicon photonics hybrid planar lightwave circuit.

BACKGROUND

There is a demand for ever-increasing data rates in electronic systems and communications. While the semiconductor industry faces the challenges of ever-increasing integrated circuit operating speeds, there is also room for improvement in interconnect speeds. Copper, the typical electrical interconnect solution, has a strong length-dependent signal loss. There is therefore motivation to reduce the length of copper interconnects. One approach to achieve this goal is multi-chip modules in which a single package includes multiple integrated circuit chips packaged closely together in a single module. Multi-chip modules (Mails) may improve signal integrity and power consumption due to shorter copper interconnect runs than standard mounting of individually packaged chips on printed circuits boards (PCBs). However, typical MCMs still utilize copper interconnects to transmit signals out of the MCMs through PCBs on which they are mounted.

Optical communications technologies, including fiber optics and integrated optical waveguides that propagate optical signals generated by modulated semiconductor lasers and light emitting diodes, for example, are advantageous for longer distance communications due to lower length-dependent and data-rate-dependent signal loss than copper. Optical communications technologies typically involve different materials and fabrication processes than electronic communications technologies. However, silicon photonics technologies bring optical communications technologies together with electronics technologies based on a common material platform.

BRIEF DESCRIPTION OF THE DRAWINGS

The present disclosure is illustrated by way of example and not limitation in the figures of the accompanying drawings, in which like references indicate similar elements and in which:

FIG. 1A is a diagram that illustrates a plan view of an optoelectronic system including an interposer separating a pair of electronic integrated circuits on one side of the interposer from a corresponding pair of photonic integrated circuits on an opposite side of the interposer and having an optical waveguide disposed on the interposer to optically connect the pair of photonic integrated circuits with each other in accordance with some embodiments.

FIG. 1B is a diagram that illustrates a cross-sectional view of the optoelectronic system of FIG. 1A in accordance with some embodiments.

FIGS. 3A-3C are diagrams that illustrate a cross-sectional view of an optoelectronic system including the interposer coupled with one of the photonic integrated circuits of FIGS. 1A and 1B in accordance with some embodiments.

DESCRIPTION

Figure 2:
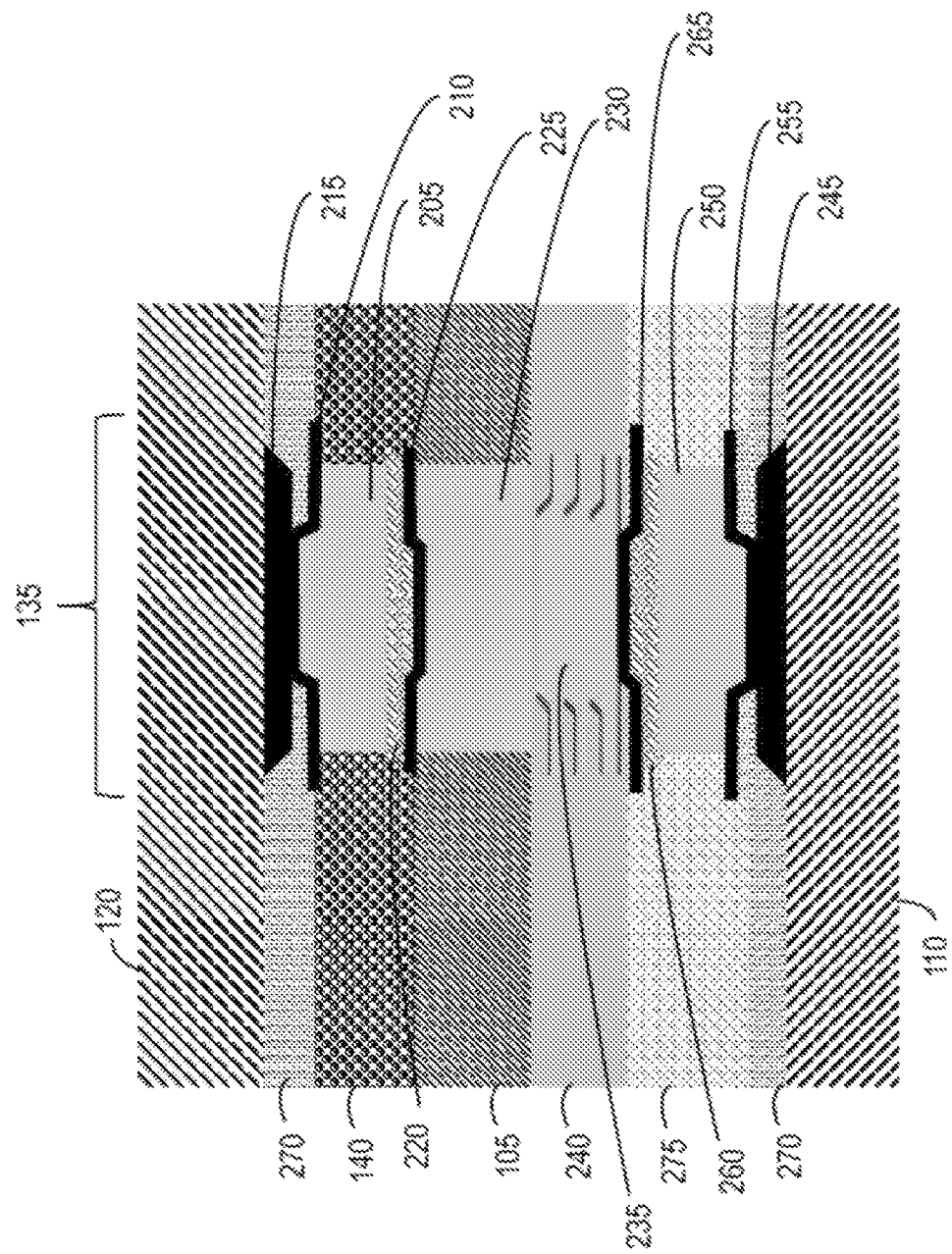
FIG. 2 is a diagram that illustrates a detailed cross-sectional view of the electronic interconnect between the electronic integrated circuit and the photonic integrated circuit of FIGS. 1A and 1B in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Silicon photonics has a promising path to ultra-high speed interconnects in electronic systems, for example, more than 50 or 100 gigabits-per-second (Gbps) per line interconnect for supercomputer, high-end data center, and autonomous automobile applications. Such silicon photonics systems may utilize hybrid electrical/optical co-packaging. Silicon photonics may be integrated with silicon electronics by packaging photonics integrated circuits with electronic integrated circuits in multi-chip modules. In this way, advantages of integrating electronic circuits in multi-chip modules can be combined with advantages of optical interconnects. Co-packaging of an optical interconnect engine with electronic integrated circuits (e.g., a central processing unit (CPU) and/or a graphics processing unit (GPU)) in a multi-chip module may provide low interconnect loss for optical interconnects between a photonics integrated circuit in the co-packaged multi-chip module and an edge of a PCB on which the co-packaged multi-chip module is mounted, for example. These multi-chip modules may include three-dimensional (3D) packaging including a CPU/GPU in combination with other electronic and/or photonic devices.

One of the challenges for co-packaging of electronic integrated circuits and photonic integrated circuits is reduction or minimization of power consumption. Reducing optical loss in the optical interconnects may reduce overall power consumption of the co-packaged solution. In various embodiments, a silicon photonic hybrid glass interposer-based planar lightwave circuit (PLC) for integrating electronic integrated circuits with photonic integrated circuits in a multi-chip module as described herein may provide lower optical propagation loss in optical interconnects than prior approaches. While embodiments of the interposer-based PLC described herein are described as comprising glass, or silicon dioxide glass, this should not be construed as limiting. In various embodiments, the interposer-based PLC may comprise another dielectric material instead, for example, a crystalline material such as sapphire or quartz, or other inorganic dielectric materials.

FIG. 1A is a schematic diagram that illustrates a plan view of an optoelectronic system 100 including an interposer 105 separating a pair of electronic integrated circuits 110, 115 on one side of the interposer 105 from a corresponding pair of photonic integrated circuits 120, 125 on an opposite side of the interposer 105 and having an optical waveguide 130 disposed on the interposer 105 to optically connect the pair of photonic integrated circuits 120, 125 with each other in accordance with some embodiments. FIG. 1B is a diagram that illustrates a cross-sectional view of the optoelectronic system 100 of FIG. 1A in accordance with some embodiments. The optoelectronic system 100 may include an optical chip-to-chip planar interconnection through the interposer 105. The photonic integrated circuits 120, 125 may function as an optical relay between the electronic integrated circuits 110, 115.

The interposer 105 may include a dielectric substrate, for example, comprised of a dielectric material such as silicon dioxide glass, sapphire crystal, quartz crystal, or other dielectric materials that may be suitable for use as a carrier wafer for mounting electronic devices, photonic devices, and waveguides thereon. The optical waveguide 130 may include a silicon nitride material grown on a surface of the interposer 105, although this should not be construed as limiting, as the optical waveguide 130 may include other materials capable of guiding light between the photonic integrated circuits 120, 125. In some embodiments, the optical waveguide 130 may include an organic dielectric material, for example, a polymer. In other embodiments, the optical waveguide 130 may include other inorganic dielectric materials. The optical waveguide 130 may optically couple with the photonic integrated circuits 120, 125 using at least one microlens. The at least one microlens may include a same material as the optical waveguide 130, e.g., silicon nitride.

In an embodiment, the electronic integrated circuit 110 may include driver circuitry for driving an optical transmitter included in the photonic integrated circuit 120 via electronic interconnects 135. The optical transmitter of the photonic integrated circuit 120 may transmit an optical signal via the optical waveguide 130. The optical waveguide 130 may guide the optical signal from the photonic integrated circuit 120 to the photonic integrated circuit 125 in a direction parallel to a surface plane of the one side of the interposer 105 that includes the pair of photonic integrated circuits 120, 125. In an embodiment, the electronic integrated circuit 115 may include driver circuitry for driving an optical receiver included in the photonic integrated circuit 125 via electronic interconnects 135. The optical receiver of the photonic integrated circuit 125 may receive the optical signal propagated via the optical waveguide 130, and provide an electrical signal corresponding to the received optical signal to the electronic integrated circuit 115.

An index matching material 140 may be disposed between each of the photonic integrated circuits 120, 125 and the interposer 105 to fill a gap, for example, a gap due to the optical waveguide 130 preventing a bottom surface of the photonic integrated circuits 120, 125 from attaching directly to the surface of the interposer 105. The index matching material 140 may include an index matching epoxy. The index matching material 140 may also minimize optical coupling loss between the photonic integrated circuits 120, 125 and optical waveguides or optical devices of the interposer 105.

One advantage of using a silicon nitride optical waveguide 130 disposed on a surface of the interposer 105 to optically couple the photonic integrated circuits 120, 125 vs. using a silicon waveguide is reduced optical propagation loss of the silicon nitride optical waveguide 130 (e.g., <0.5 dB/cm) compared to a silicon waveguide (e.g., approximately 2 dB/cm). Due to the relatively high propagation loss of a silicon waveguide, e.g., on a silicon photonics chip, its routing distance may be limited to less than about 2 cm. Because of its much lower propagation loss, a silicon nitride optical waveguide 130 on the interposer 105 may have a much longer achievable routing distance than a silicon waveguide on a silicon photonics chip. The silicon nitride optical waveguide 130 may also have lower coupling loss with the photonic integrated circuits 120, 125 compared to a silicon waveguide. In addition, the optical waveguide 130 may provide a smaller form factor than fiber routing to optically couple the photonic integrated circuits 120, 125. For example, the silicon nitride optical waveguide 130 may have a bend radius less than about 5 mm, whereas an optical fiber may have a minimum bend radius of about 2 cm.

While the photonic integrated circuits 120, 125 are illustrated as being on a same side of the interposer 105, this should not be construed as limiting, as in various embodiments, optical devices and/or photonic integrated circuits may be disposed on either or both sides of the interposer 105 and optically coupled through optical waveguides that pass through the interposer 105 or an optical beam that passes through an opening or an optically transmissive portion of the interposer 105.

FIG. 2 is a diagram that illustrates a detailed cross-sectional view of the electronic interconnect 135 between the electronic integrated circuit 110 and the photonic integrated circuit 120 of FIGS. 1A and 1B in accordance with some embodiments. The electronic interconnect 135 may include an interconnect bump 205 disposed on a bottom side of the photonic integrated circuit 120 to electrically couple the photonic integrated circuit 120 with the interposer 105. The interconnect bump 205 may include a copper material, although this should not be construed as limiting, as in various embodiments, the interconnect bump 205 may comprise another electrically conductive material, e.g., tin, lead, silver, zinc, bismuth, indium, antimony, and/or other metals. An under bump metal layer 210 may be disposed between the interconnect bump 205 and a metal pad 215 of the photonic integrated circuit 120 to provide a physical coupling of the interconnect bump 205 with the bottom side of the photonic integrated circuit 120. The metal pad 215 may include an aluminum material, although this should not be construed as limiting, as in various embodiments, the metal pad 215 may comprise another electrically conductive material, e.g., copper, tin, lead, silver, zinc, bismuth, indium, antimony, and/or other metals. Solder 220 may electrically couple the interconnect bump 205 with a corresponding interposer via 230 of the interposer 105 via an under bump metal layer 225 disposed on a top surface of the interposer via 230. The under bump metal layer 225 may be shaped with an indentation in a middle region of the under bump metal layer 225 to aid in centering the solder 220 and interconnect bump 205 over the interposer via 230 as the solder 220 flows and solidifies during the manufacturing process of attaching the photonic integrated circuit 120 to the interposer 105. The interposer via 230 may include a copper material or other conductive material as discussed elsewhere herein.

The interposer via 230 may be coupled with a stacked via 235 of a redistribution layer (RDL) 240. The RDL 240 may include a plurality of layers of electrical interconnect to couple one or more metal pads 245 of the electronic integrated circuit 110 with one or more other metal pads 245 of the electronic integrated circuit 110, other electronic integrated circuits that may also be electrically coupled with the RDL 240, and one or more interposer vias 230 of the interposer 105. The RDL 240 may be fabricated as a copper metallization formed on top of a dielectric layer. The dielectric layer of the RDL 240 may be organic or inorganic.

An interconnect bump 250 may be disposed on a top side of the electronic integrated circuit 110 to electrically couple the electronic integrated circuit 110 with the interposer 105. The interconnect bump 250 may include a copper material, although this should not be construed as limiting, as in various embodiments, the interconnect bump 250 may comprise another electrically conductive material, e.g., tin, lead, silver, zinc, bismuth, indium, antimony, and/or other metals. An under bump metal layer 255 may be disposed between the interconnect bump 250 and the metal pad 245 of the electronic integrated circuit 110 to provide a physical coupling of the interconnect bump 250 with the top side of the electronic integrated circuit 110. The metal pad 245 may include an aluminum material, although this should not be construed as limiting, as in various embodiments, the metal pad 245 may comprise another electrically conductive material, e.g., copper, tin, lead, silver, zinc, bismuth, indium, antimony, and/or other metals. Solder 260 may electrically couple the interconnect bump 250 with the corresponding stacked via 235 of the RDL 240 via an under bump metal layer 265 disposed on a bottom surface of the stacked via 235. The under bump metal layer 265 may be shaped with an indentation in a middle region of the under bump metal layer 265 to aid in centering the solder 260 and interconnect bump 250 under the stacked via 235 as the solder 260 flows and solidifies during the manufacturing process of attaching the electronic integrated circuit 110 to the RDL 240. Polyimide or dielectric passivation 270 may be disposed surrounding the metal pads 215 and/or 245 of the photonic integrated circuit 120 and/or the electronic integrated circuit 110, respectively. The polyimide or dielectric passivation 270 may include inorganic and/or organic materials. Space surrounding the interconnect bump 250 between the polyimide or dielectric passivation 270 of the electronic integrated circuit 110 and the RDL 240 may be filled with an underfill material 275 during the manufacturing process for mechanical stability of the optoelectronic system 100. The manufacturing process of the optoelectronic system 100 is described in greater detail below with respect to FIGS. 5 and 6.

Optical fanout of optical waveguides 130 disposed on the interposer 105 may be considered an optical analog of electrical signal fanout of the RDL 240. The hybrid integration of the RDL 240 with the interposer 105 for propagation of both electrical signals and optical signals between electrical integrated circuits 110, 115 and photonic integrated circuits 120, 125 may be highly manufacturable and economical compared to prior embodiments of interfaces between electronic and photonic devices and circuits. The hybrid integration of the RDL 240 with the interposer 105 may integrate mechanical, electrical, and optical elements together to form a high performance optoelectronic MCM.

FIGS. 3A-3C are diagrams that illustrate a cross-sectional view of an optoelectronic system 300 including the interposer 105 coupled with one of the photonic integrated circuits 120, 125 of FIGS. 1A and 1B in accordance with some embodiments.

An optical waveguide 340 on a bottom surface of the photonic integrated circuit 120, 125 may optically couple with the optical waveguide 130 of the interposer 105 via a vertically integrated taper (VIT) 350. In some embodiments as illustrated in FIG. 3A, the VIT 350 may include a pair of microlenses 360, 370 facing one another. The pair of microlenses 360, 370 may be separated by a portion of the index matching material 140. The microlenses 360, 370 may be fabricated on silicon nitride using polymer (e.g., in a manner similar to inkjet printed polymer microlenses) or nitride and may be on the order of about 100 microns (μm) in diameter. In some embodiments as illustrated in FIG. 3B, the VIT 350 may include a microlens 380 on one of the optical waveguides 130, 340, facing the tapered portion of the other of the optical waveguides 130, 340. The microlens 380 and the one of the optical waveguides 130, 340 may be separated by a portion of the index matching material 140. The microlens 380 may be fabricated on silicon nitride using polymer (e.g., in a manner similar to inkjet printed polymer microlenses) or nitride and may be on the order of about 100 microns (μm) in diameter. In some embodiments as illustrated in FIG. 3C, the VIT 350 may not include a microlens, and the tapered portions of the optical waveguides 130, 340 may face each other. The tapered portions of the optical waveguides 130, 340 may be constructed to behave as a mirror to reflect light traveling along the lengthwise portion of the optical waveguide to reflect toward the tapered portion of the other optical waveguide and then be reflected within the other optical waveguide to propagate along the lengthwise portion of the other optical waveguide.

In an embodiment, a normal incidence photodiode (PD) of an optical receiver of the photonic integrated circuit 125 may optically couple directly with the VIT 350. In an embodiment, a re-entrance mirror may be combined with a silicon lens to couple the PD of the optical receiver of the photonic integrated circuit 125 with the VIT 350. In an embodiment, a semiconductor laser diode (LD) of an optical transmitter of the photonic integrated circuit 120 may optically couple directly with the VIT 350. In an embodiment, a re-entrance mirror may be combined with a silicon lens to couple the LD of the optical transmitter of the photonic integrated circuit 120 with the VIT 350.

Light coupling between the optical waveguides 130, 340, between the microlenses 360, 370, or between the microlens 380 and the optical waveguide 340 in the VIT 350 may be sensitive to horizontal offsets between the optical waveguides 130, 340 and/or the microlenses 360, 370, 380 in the VIT 350, and therefore performance of the optoelectronic system 100 may suffer when the photonic integrated circuit 120, 125 is even somewhat horizontally offset from the interposer 105. A chip-to-chip alignment ball 330 may be seated between an alignment notch 310 disposed in the interposer 105 and a corresponding alignment notch 320 in the photonic integrated circuit 120, 125. The chip-to-chip alignment ball 330 may comprise a hard material, e.g., a glass bead or a bead of another dielectric or hard material. The thermal expansion coefficient of the alignment ball 330 may be closely matched to the surrounding materials (e.g., the index matching material 140 surrounding the alignment ball 330, the interposer 105, and the substrate of the photonic integrated circuit 120, 125). The alignment notches 310, 320 may be defined by a lithographic step in the manufacturing process of the optoelectronic system 300. In an embodiment, the alignment of the photonic integrated circuit 120, 125 with the interposer 105 using the alignment notches 310, 320 and alignment ball 330 may be accurate to within <3 µm. The alignment notch 320 in the photonic integrated circuit 120, 125 may be fabricated by a potassium hydroxide (KOH) wet etch process taking a crystal plane of the photonic integrated circuit 120, 125 into account. The alignment notch 310 may be fabricated as part of the manufacturing process described with reference to FIGS. 5 and 6.

In an embodiment, the optical waveguide 130 may be end-coupled with an optical fiber at an out-coupling facet 390 of the interposer 105 illustrated in FIGS. 3A-3C. An out-coupling facet 390 may be fabricated on the interposer 105 at any position where an optical fiber may be attached or coupled with the interposer 105. Dimensions of the optical waveguide 130 may be varied along a length of the optical waveguide 130 to optimize coupling efficiency of light from the optical waveguide 130 to an optical fiber external to the interposer 105 and edge-coupled with the interposer 105 at a position where the optical waveguide 130 outputs light from the interposer 105 via the out-coupling facet 390.

In an embodiment, a planar microlens may be disposed on the interposer 105 at the out-coupling facet 390 to couple light from the interposer 105 to an optical fiber external to the interposer 105. The planar microlens may comprise a single element or a plurality of individual elements configured to focus light to a point where the optical fiber couples with the interposer 105. The individual elements of the planar microlens may include a silicon dioxide material. The geometries of the individual elements of the planar microlens may be specifically shaped to have desirable light-bending and focusing properties to increase a percentage of light coupled from the planar microlens into the optical fiber. The planar microlens may be positioned at an end of an optical waveguide 130 between the optical waveguide 130 and an end of the interposer 105 at the out-coupling facet 390 where the optical fiber is coupled with the interposer 105.

In contrast to a typical silicon photonics chip without using the interposer 105, the optoelectronic system 300 that uses the interposer 105 may propagate optical signals in any direction external to the optoelectronic system 100, including both parallel to a surface of the interposer 105 and perpendicular to a surface of the interposer 105, whereas the typical silicon photonics chip may limit external optical propagation to a direction parallel with a surface of the silicon photonics chip. The optoelectronic system 300 may therefore realize a flexible fiber coupling design, facilitating placement of an out-coupling facet 390 from the interposer 105 to a fiber at any point where a fiber may be coupled to the interposer 105.

Figure 4:
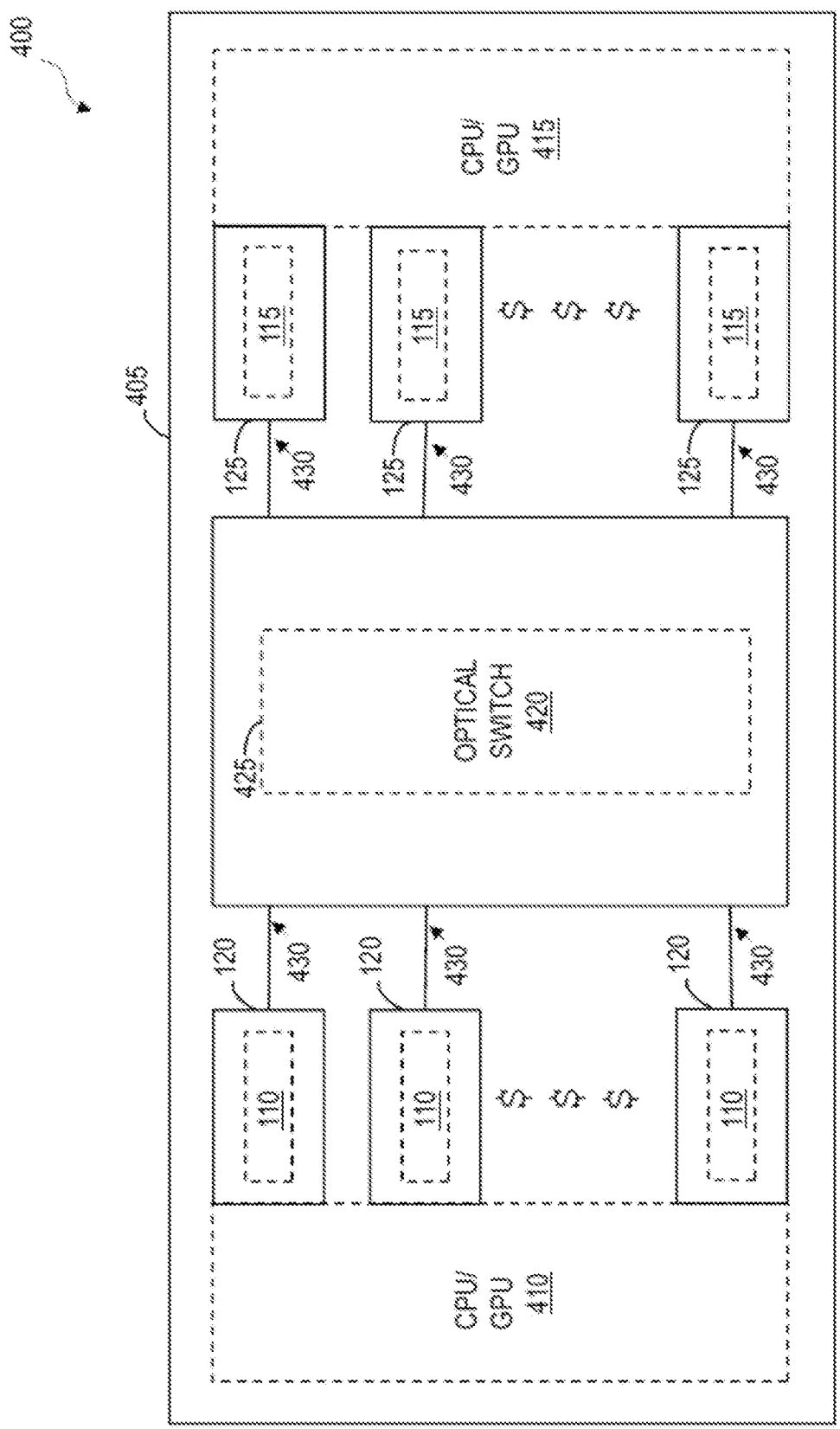
FIG. 4 is a diagram that illustrates a plan view of an optoelectronic system including an interposer separating electronic integrated circuits on one side of the interposer from corresponding photonic integrated circuits on an opposite side of the interposer and having an optical switch disposed on the interposer to optically connect the photonic integrated circuits with each other via optical waveguides in accordance with some embodiments.

FIG. 4 is a diagram that illustrates a plan view of an optoelectronic system 400 including an interposer 405 separating electronic integrated circuits 110, 115 on one side of the interposer 405 from corresponding photonic integrated circuits 120, 125 on an opposite side of the interposer 405 and having an optical switch 420 disposed on the interposer 405 to optically connect the photonic integrated circuits 120, 125 with each other via optical waveguides 430 in accordance with some embodiments. The optoelectronic system 400 may include a co-packaged chip-to-chip interconnect through the interposer 405 and optical switch 420. The optical switch 420 may facilitate an optical/electrical co-packaged chip interconnect solution featuring flexible optical routing on the interposer 405. In various embodiments, the interposer 405 may be include a glass material, e.g., a silicon dioxide glass, or other dielectric material as discussed elsewhere herein.

Each of the electronic integrated circuits 110, 115 may electrically couple with a corresponding central processing unit (CPU) and/or graphics processing unit (GPU) 410, 415 to perform computations. The electronic integrated circuits 110, 115 may be electrically coupled with the corresponding photonic integrated circuits 120, 125, respectively, to communicate with each other and/or other pairs of electronic integrated circuits and photonic integrated circuits via the optical switch 420. To this end, each of the photonic integrated circuits 120, 125 may include a plurality of optical transmitters and/or a plurality of optical receivers electrically coupled with corresponding communications circuitry of the corresponding electronic integrated circuits 110, 115, respectively. Each of the CPU/GPU 410, 415 may be electronically coupled with a plurality of electronic integrated circuits 110, 115 to send and receive data via corresponding photonic integrated circuits 120, 125 through the optical switch 420 via optical waveguides 430. In some embodiments, one or more of the photonic integrated circuits 120, 125 and the optical switch 420 may be optically coupled with an optical fiber or other optical waveguide or optical device external to the interposer 405 via an optical waveguide 430 or other optical element disposed on the interposer 405 as described elsewhere herein. The optical waveguides 430 may be embodiments of the optical waveguides 130 discussed above with respect to FIGS. 1A, 1B, and 3A-3C.

The optical switch 420 may be disposed on a same side of the interposer 405 as the photonic integrated circuits 120, 125, and may be communicatively coupled with the photonic integrated circuits 120, 125 via a plurality of optical waveguides (e.g., optical waveguides 130 as discussed above with respect to FIG. 1A). The optical switch 420 may be controlled by an electronic integrated circuit 425 situated on an opposite side of the interposer 405 relative to the optical switch 420 and coupled with the optical switch 420 via one or more electronic interconnects (e.g., electronic interconnect 135 as discussed above with respect to FIGS. 1B and 2) and/or one or more of the electronic integrated circuits 110, 115. The optical switch 420 may switch an input optical signal coming in one input port of the optical switch 420 to any one of a plurality of output ports of the optical switch 420 according to a control signal provided to the optical switch 420 by the electronic integrated circuit that controls the optical switch 420. A plurality of paths through the optical switch 420 may be simultaneously switched and active, and each of the plurality of the paths may connect a different pair of input ports and output ports of the optical switch 420 to provide controllable connectivity between optical communication ports of the photonic integrated circuits 120, 125.

The optical switch 420 may be fabricated on silicon in various embodiments. In some embodiments, the optical switch 420 may be embedded within the interposer 405 rather than on a same surface and on a same plane as the photonic integrated circuits 120, 125 with which the optical switch 420 is optically coupled via the optical waveguides 430. In various embodiments, the optical switch 420 may include a micro-electro-mechanical system (MEMS) device, a liquid crystal (LC) device, or other device capable of controlled switching of optical communication paths. In various embodiments, the optical switch 420 may include a photonic integrated circuit. The optical switch 420 may provide fast non-blocking N×N switching capability to controllably provide N optical communication paths simultaneously between N optical transmitters and N optical receivers, where N may range from 2, 4, 8, 16, 32, 64, 128, 256, or other number of communication paths.

In various embodiments, there may be any number of photonic integrated circuits 120, 125 coupled with corresponding electronic integrated circuits 110, 115 that have optical communication paths routed through the optical switch 420, including one, two, three, four, six, eight, twelve, sixteen, thirty-two, sixty-four, etc., and upward, and including any number in between. In various embodiments, there may also be more optical switches 420 involved in interconnecting the photonic integrated circuits 120, 125. Each of the photonic integrated circuits 120, 125 disposed on the interposer 405 may have any number of optical transmitters and/or receivers that communicate via a switched optical channel routed through the optical switch 420, and these optical transmitters and/or receivers may communicate with other optical transmitters and/or receivers on any of the same or different photonic integrated circuits either disposed on the interposer 405 or external to the interposer 405 and coupled with the interposer 405 as discussed elsewhere herein, e.g., with respect to FIG. 3.

Figure 5A:
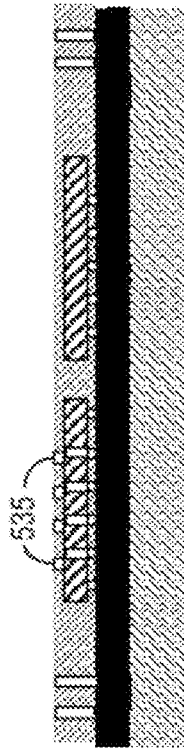
FIGS. 5A-5P are diagrams that illustrate cross-sectional views of an optoelectronic system including an interposer, electronic integrated circuits, and photonic integrated circuits after different fabrication operations in accordance with some embodiments.
Figure 5B:
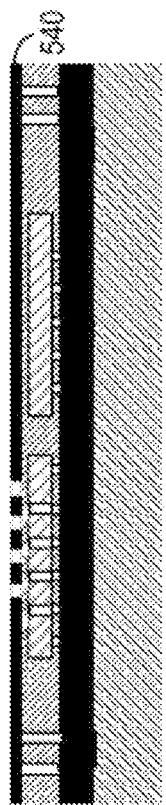
Figure 5C:
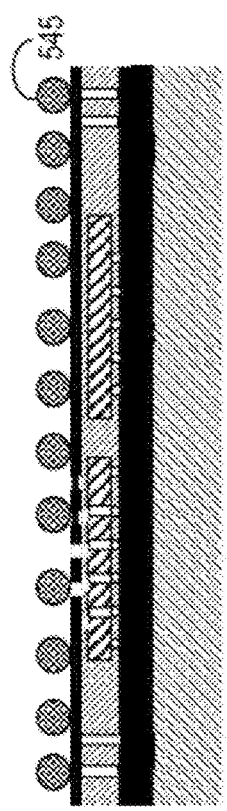
Figure 5D:
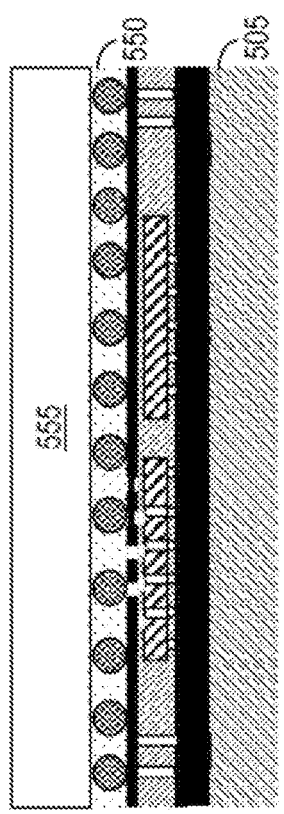
Figure 5E:
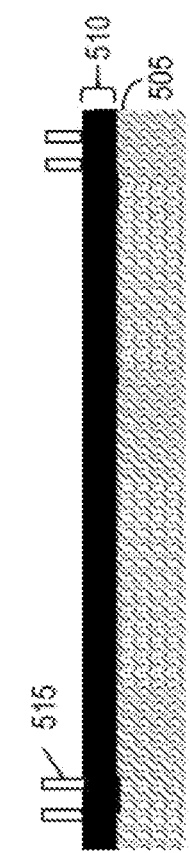
Figure 5F:
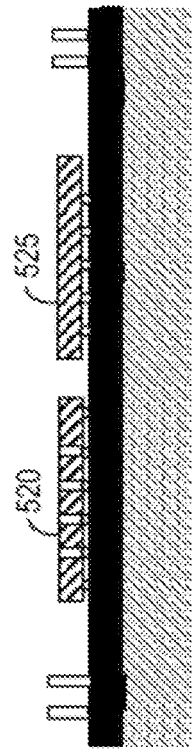
Figure 5G:
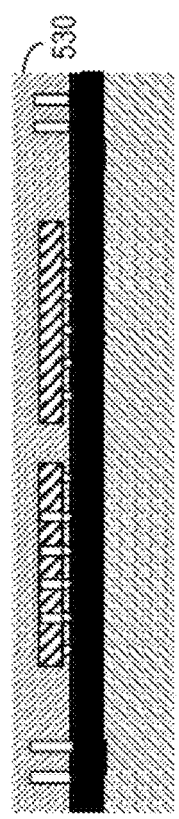
Figure 5H:
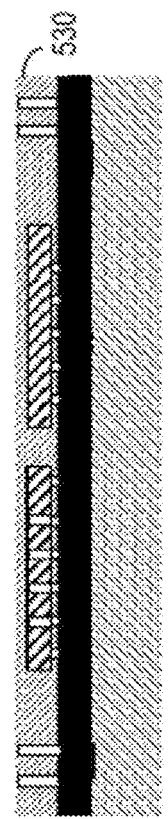
Figure 5P:
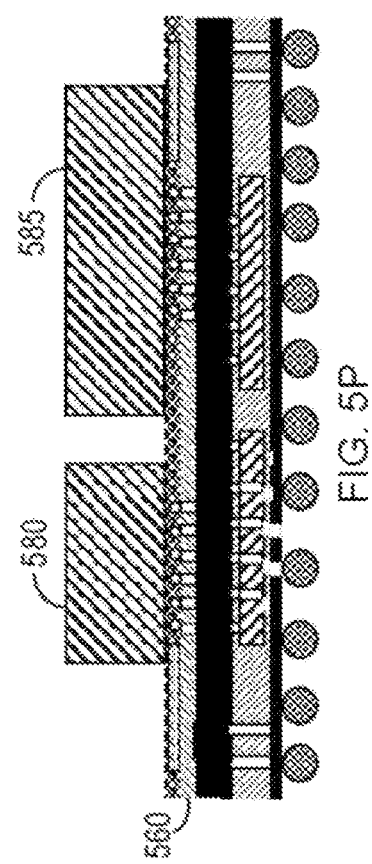

FIGS. 5A-5P are diagrams that illustrate cross-sectional views of an optoelectronic system including an interposer 560, electronic integrated circuits 520, 525, and photonic integrated circuits 580, 585 after different fabrication operations in accordance with some embodiments. The optoelectronic system of FIGS. 5A-5P may include a silicon photonic hybrid PLC fabricated by an optical/electrical co-packaging process flow.

FIG. 5A illustrates an RDL 510 fabricated on a surface of a carrier wafer 505. The carrier wafer 505 may include a dielectric material, e.g., a glass material. In various embodiments, the carrier wafer 505 may include a silicon dioxide glass material. The carrier wafer 505 may be transformed into the interposer 560 during the fabrication process as discussed with respect to FIG. 5J herein. The RDL 510 may include a plurality of metal interconnects, including lines running parallel to a surface of the carrier wafer 505 on which the RDL 510 is fabricated and vias running perpendicular to the surface of the carrier wafer 505 and through one or more layers of the RDL 510. High metal columns 515 may protrude from the surface of the RDL 510 to facilitate co-packaging assembly. The high metal columns 515 and the metal interconnects of the RDL 510 may include copper material, although this should not be construed as limiting, as in various embodiments, the high metal columns 515 and/or the metal interconnects of the RDL 510 may comprise another electrically conductive material, e.g., aluminum, tin, lead, silver, zinc, bismuth, indium, antimony, and/or other metals. The RDL 510 may provide electrical interconnect routing between electronic integrated circuits, photonic integrated circuits, and electronic circuits external to the optoelectronic system comprising the RDL 510, e.g., via a PCB on which the optoelectronic system may be mounted.

FIG. 5B illustrates electronic integrated circuits 520, 525 mounted on the RDL 510. The electronic integrated circuits 520, 525 may be mounted with metal balls (e.g., solder balls) attaching to metal vias on a surface of the RDL 510. One or more of the electronic integrated circuits mounted on the RDL may include one or more through-silicon-vias (TSV) 522, as depicted in 520.

FIG. 5C illustrates a mold process in which a mold 530 is cast over the electronic integrated circuits 520, 525 and metal columns 515 to affix them in place and provide stability for the optoelectronic system as a multi-chip module.

FIG. 5D illustrates the mold 530 after being polished to align a height of the mold 530 with a height of the metal columns 515.

FIG. 5E illustrates vias 535 being formed in the mold 530 to provide access to interconnect pads on the substrate of electronic integrated circuit 520 closest to the surface of the mold 530. The vias 535 may be filled with a metal as used in the metal columns 515, e.g., copper, to provide connectivity from the electronic integrated circuits to a surface of the mold 530. The interconnect pads on the substrate of electronic integrated circuit 520 closest to the surface of the mold 530 may connect to through-silicon-vias, which in turn may connect to electronic circuit pads at the active side of the electronic integrated circuit 520 closest to RDL 510.

FIG. 5F illustrates a second RDL 540 fabricated on the surface of the mold 530. Metal interconnects of the second RDL 540, which may include materials similar to those of the RDL 510, may electrically couple with the vias 535 and/or the metal columns 515.

FIG. 5G illustrates C4 bump balls 545 attached to the second RDL 540. The C4 bump balls 545 may facilitate attaching the optoelectronic system as a multi-chip module to a PCB and facilitate electrical communication paths from the PCB to the electronic integrated circuits 520, 525 and/or the photonic integrated circuits 575, 580 when the optoelectronic system is attached to the PCB. The C4 bump balls 545 may comprise copper and/or another electrically conductive material, e.g., aluminum, tin, lead, silver, zinc, bismuth, indium, antimony, and/or other metals.

FIG. 5H illustrates a carrier wafer 555 attached to the C4 bump balls 545 to provide mechanical support during subsequent fabrication and processing operations of the optoelectronic system. A filler material 550 may be disposed between the C4 bump balls 545 and filling a gap between the carrier wafer 555 and the RDL 540 when the carrier wafer 555 is attached to the C4 bump balls 545 to provide additional stability and protection of the structure of the optoelectronic system during the subsequent fabrication and processing operations.

FIG. 5I illustrates the optoelectronic system being flipped over for the subsequent fabrication and processing operations.

FIG. 5J illustrates in an embodiment the carrier wafer 505 being thinned to form the interposer 560. In another embodiment, the carrier wafer 505 may be removed and replaced with the interposer 560. By thinning the carrier wafer 505, a glass carrier wafer 505 may become a glass interposer 560 by merely thinning the glass carrier wafer 505 rather than needing to remove the carrier wafer 505 altogether prior to attaching a new interposer 560 where the carrier wafer 505 had previously been. By thinning the carrier wafer 505 to become the interposer 560 on which optical waveguides may be fabricated, processing steps may be saved thereby reducing cost and improving yield and reliability of the optoelectronic system. In some embodiments, after thinning of the carrier wafer 505 to form the interposer 560, one or more alignment notches may be created in the interposer 560 as discussed above with respect to FIG. 3 in order to aid in alignment of the photonic integrated circuits 575, 580 when attached to the interposer 560.

FIG. 5K illustrates holes 565 being formed in the interposer 560. In some embodiments, after thinning of the carrier wafer 505 to form the interposer 560, one or more alignment notches may be created in the interposer 560 as discussed above with respect to FIGS. 3A-3C in conjunction with forming the holes 565 in order to aid in alignment of the photonic integrated circuits 580, 585 when attached to the interposer 560.

FIG. 5L illustrates the holes 565 being filled with a conducting material, e.g., a metal such as copper as may be used in the metal columns 515, to form vias 570 to provide electrical connectivity between the RDL 510 and an opposite side of the interposer 560. When alignment notches are formed in the interposer 560, alignment balls may also be inserted into the alignment notches after the holes 565 are filled with a conducting material.

FIG. 5M illustrates optical waveguides 575 being fabricated on a top surface of the interposer 560. The optical waveguides 575 may be formed of a silicon nitride material via silicon nitride deposition on the interposer 560. Microlenses and coupling interface patterning may also be formed on the interposer 560, and may be formed of a silicon nitride material via silicon nitride deposition, also. The optical waveguides 575 and any microlenses or coupling interfaces disposed on the interposer 560 may be formed to align with optical transmitter and/or optical receiver positions of photonic integrated circuits 580, 585 to be subsequently mounted on the interposer 560.

Figure 5N:
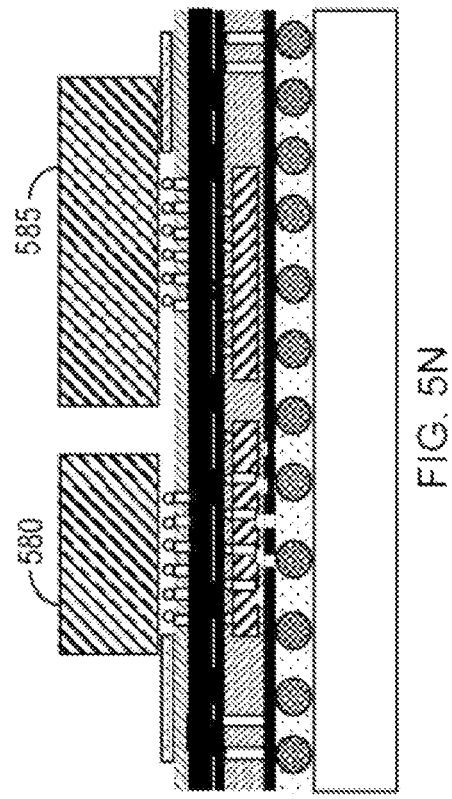

FIG. 5N illustrates photonic integrated circuits 580, 585 being coupled with a top surface of the interposer 560. The photonic integrated circuits 580, 585 may be aligned to electrically couple with the vias 570 and optically couple with the optical waveguides 575. The photonic integrated circuits 580, 585 may include silicon photonics integrated circuit dies, and may be attached to the vias 570 of the interposer 560 by metal bumps, e.g., solder, copper, or other conductive materials, as discussed elsewhere herein.

Figure 5O:
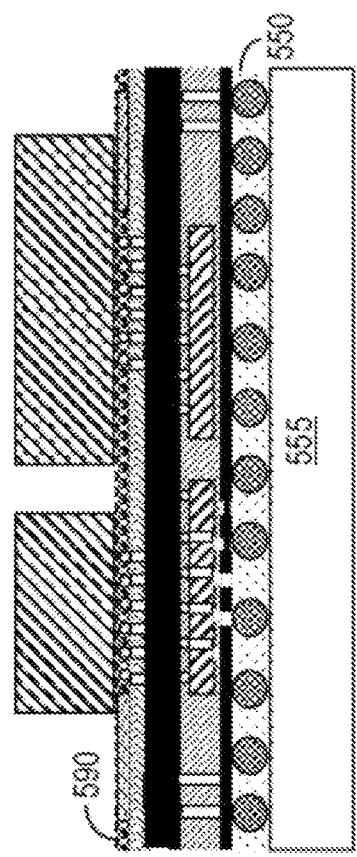

FIG. 5O illustrates an index matching material 590 being disposed over the surface of the interposer 560 including filling between and over the various optical waveguides 575 and other optical devices, e.g., microlenses, fabricated on the surface of the interposer 560. The index matching material 590 may fill gaps between the photonic integrated circuits 580, 585 and the interposer 560 while permitting optical signals to propagate through the index matching material 590 between the photonic integrated circuits 580, 585 and the optical waveguides 575 and other optical devices disposed on the interposer 560. The index matching material 590 may reduce or minimize coupling losses between the photonic integrated circuits 580, 585 and the optical waveguides 575 and other optical devices disposed on the interposer 560. FIG. 5P illustrates the completed optoelectronic system after being released from the carrier wafer 555.

Figure 6:
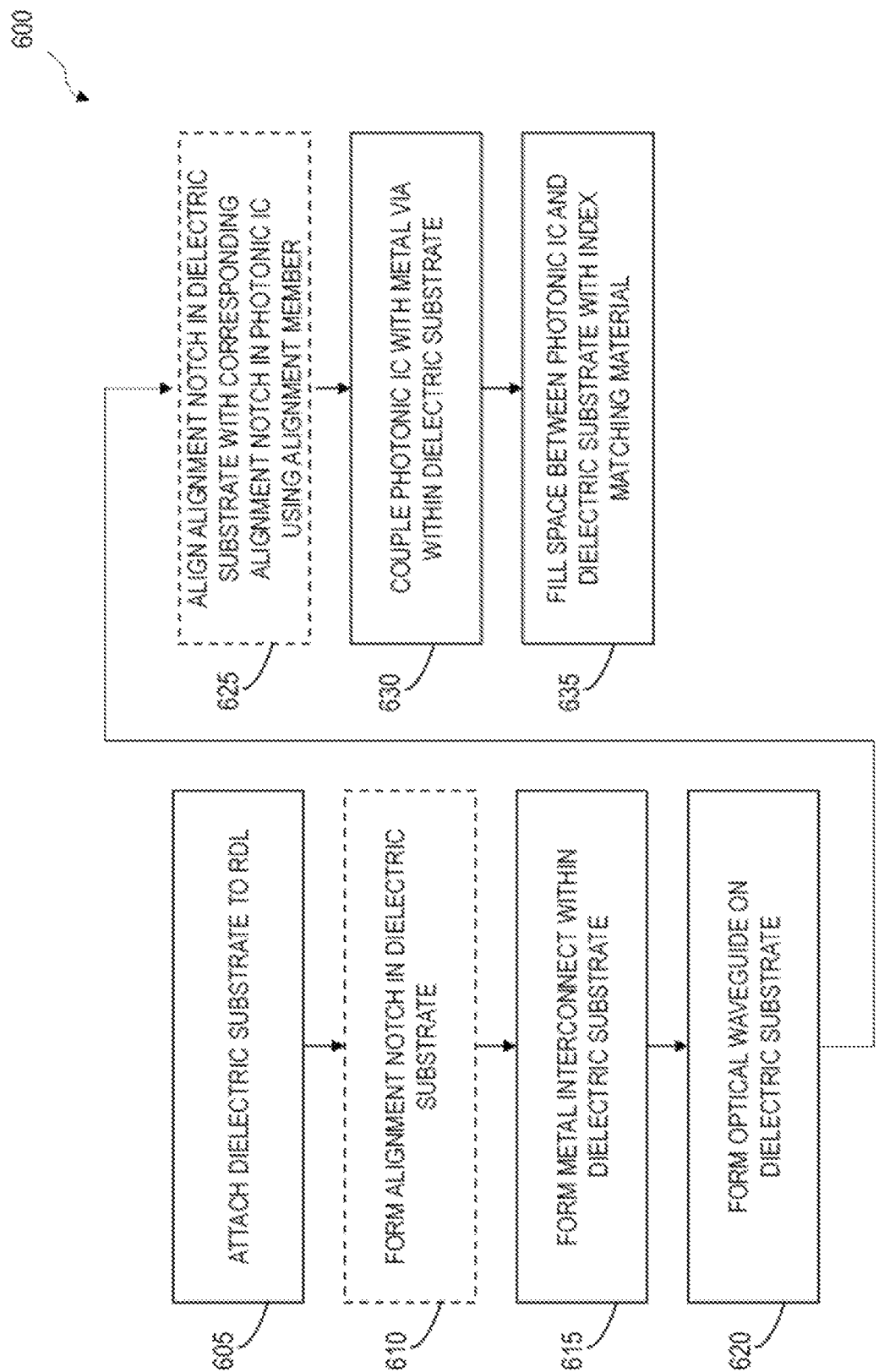
FIG. 6 is a block diagram that illustrates a method of fabricating an optoelectronic system including an interposer, electronic integrated circuits, and photonic integrated circuits in accordance with some embodiments.

FIG. 6 is a block diagram that illustrates a method 600 of fabricating an optoelectronic system including an interposer, electronic integrated circuits, and photonic integrated circuits in accordance with some embodiments. The optoelectronic system may be an embodiment of the optoelectronic systems 100, 300, 400, and the interposer may be an embodiment of the interposers 105, 405, and 560.

In an operation 605, a dielectric substrate (e.g., 505, 560) may be attached to an RDL (e.g., 510) having a metal via coupled with an electronic integrated circuit (e.g., 520, 525) on one side of the dielectric substrate. The dielectric substrate may include a glass material, e.g., silicon dioxide glass. Attaching the dielectric substrate (e.g., 560) may comprising thinning a carrier wafer (e.g., 505) attached to the RDL. The RDL may include a plurality of metal interconnects, including lines running parallel to a surface of the dielectric substrate attached to the RDL and vias running perpendicular to the surface of the dielectric substrate and through one or more layers of the RDL, some of which may couple with the electronic integrated circuit.

In an optional operation 610, an alignment notch (e.g., 310) may be formed in the dielectric substrate. The alignment notch may be defined by a lithographic step in the manufacturing process of the optoelectronic system that also defines holes for metal interconnects to be formed within the dielectric substrate, e.g., in operation 615 described below.

In an operation 615, a metal interconnect may be formed within the dielectric substrate to pass through the dielectric substrate from the RDL on the one side of the dielectric circuit to a photonic integrated circuit on an other side of the dielectric substrate. The metal interconnect may include copper material, although this should not be construed as limiting, as in various embodiments, the metal interconnects of the RDL may comprise another electrically conductive material, e.g., aluminum, tin, lead, silver, zinc, bismuth, indium, antimony, and/or other metals.

In an operation 620, an optical waveguide may be formed on the other side of the dielectric substrate along a plane parallel with a plane of a surface of the dielectric substrate. The optical waveguide may comprise a silicon nitride material grown on a surface of the dielectric substrate, although this should not be construed as limiting, as the optical waveguide may include other materials capable of guiding light to and/or from a photonic integrated circuit also disposed on the other side of the dielectric substrate. In some embodiments, the optical waveguide may include an organic dielectric material, for example, a polymer. In other embodiments, the optical waveguide may include other inorganic dielectric materials. Other optical devices, e.g., a microlens, a coupling interface, etc., may also be formed on the other side of the dielectric substrate. The other optical devices may also be formed of a same material or of a different material of the optical waveguide.

In an optional operation 625, the alignment notch in the dielectric substrate may be aligned with a corresponding alignment notch in the photonic integrated circuit using an alignment member that seats in the alignment notches in both the dielectric substrate and the photonic integrated circuit. The alignment member may be a chip-to-chip alignment ball (e.g., 330). The chip-to-chip alignment ball 330 may comprise a hard material, e.g., a glass bead or a bead of another dielectric or hard material. The thermal expansion coefficient of the alignment member may be closely matched to the surrounding materials (e.g., the index matching material surrounding the alignment member, the dielectric substrate, and the substrate of the photonic integrated circuit). In an embodiment, the alignment of the photonic integrated circuit with the dielectric substrate using the alignment notch and alignment member may be accurate to within <3 µm.

In an operation 630, a photonic integrated circuit (e.g., 575, 580) may be coupled with the metal via. (e.g., 570) within the dielectric substrate and the optical waveguide on the other side of the dielectric substrate. The photonic integrated circuit may be aligned to electrically couple with the via and optically couple with the optical waveguide. The photonic integrated circuit may include a silicon photonics integrated circuit die, and may be attached to the via of the dielectric substrate by metal bumps, e.g., solder, copper, or other conductive materials, as discussed elsewhere herein.

In an operation 635, space between the photonic integrated circuit and the other side of the dielectric substrate may be filled with index matching material. The index matching material may include an index matching epoxy. The index matching material may fill between and over various optical waveguides and other optical devices, e.g., microlenses, fabricated on the surface of the dielectric substrate. The index matching material may fill gaps between the photonic integrated circuit and the dielectric substrate while permitting optical signals to propagate through the index matching material between the photonic integrated circuit and the optical waveguide and other optical devices disposed on the dielectric substrate. The index matching material may reduce or minimize coupling losses between the photonic integrated circuit and the optical waveguide and/or other optical devices disposed on the dielectric substrate.

It should be noted that embodiments are not limited to the operations, phases, frames, signals and/or other elements shown in the FIGS. 1-6. Some embodiments may not necessarily include all operations, phases, frames, signals and/or other elements shown. Some embodiments may include one or more additional operations, phases, frames, signals and/or other elements. One or more operations may be optional, in some embodiments.

Example 1 is an interposer apparatus comprising: a dielectric substrate; an optical waveguide disposed on the dielectric substrate to optically couple a photonic integrated circuit disposed on one side of the dielectric substrate with at least one of another photonic integrated circuit disposed on the dielectric substrate, an optical device disposed on the dielectric substrate, or an optical waveguide disposed external to the dielectric substrate; and a metal interconnect disposed through the dielectric substrate to electrically couple the photonic integrated circuit disposed on the one side of the dielectric substrate with an electronic integrated circuit disposed on the other side of the dielectric substrate.

In Example 2, the subject matter of Example 1 optionally includes wherein the dielectric substrate comprises silicon dioxide glass.

In Example 3, the subject matter of any one or more of Examples 1-2 optionally include wherein the optical waveguide comprises an organic dielectric material.

In Example 4, the subject matter of any one or more of Examples 1-3 optionally include wherein the optical waveguide is configured to guide light in a direction parallel to a surface plane of the one side of the dielectric substrate.

In Example 5, the subject matter of any one or more of Examples optionally include wherein the dielectric substrate includes an alignment notch disposed on the one side of the dielectric substrate to seat an alignment ball to align the dielectric substrate with the photonic integrated circuit, wherein the photonic integrated circuit includes a corresponding alignment notch to seat the alignment ball.

In Example 6, the subject matter of any one or more of Examples 1-5 optionally include wherein the optical waveguide includes a microlens to optically couple with a corresponding microlens of the photonic integrated circuit.

In Example 7, the subject matter of any one or more of Examples 1-6 optionally include an index matching material disposed between the photonic integrated circuit and the dielectric substrate.

Example 8 is an optoelectronic system comprising: a first photonic integrated circuit; a first electronic integrated circuit; and a dielectric substrate disposed between the first photonic integrated circuit and the first electronic integrated circuit, wherein the dielectric substrate includes: a first optical waveguide disposed on the dielectric substrate to optically couple the first photonic integrated circuit disposed on one side of the dielectric substrate with at least one of a second photonic integrated circuit disposed on the one side of the dielectric substrate, an optical device disposed external to the dielectric substrate, or an external optical waveguide disposed external to the dielectric substrate by guiding light in a direction parallel to a surface plane of the one side of the dielectric substrate; and a metal interconnect disposed through the dielectric substrate to electrically couple the first photonic integrated circuit disposed on the one side of the dielectric substrate with the first electronic integrated circuit disposed on the other side of the dielectric substrate.

In Example 9, the subject matter of Example 8 optionally includes the second photonic integrated circuit, wherein the first photonic integrated circuit includes a photonic transmitter circuit and the second photonic integrated circuit includes a photonic receiver circuit.

In Example 10, the subject matter of any one or more of Examples 8-9 optionally include a third photonic integrated circuit disposed on the one side of the dielectric substrate, wherein the dielectric substrate includes a second optical waveguide disposed on the dielectric substrate to optically couple at least one of the first photonic integrated circuit and the second photonic integrated circuit with the third photonic integrated circuit.

In Example 11, the subject matter of Example 10 optionally includes wherein the first photonic integrated circuit includes a photonic transmitter circuit, the third photonic integrated circuit includes a photonic receiver circuit, and the second photonic integrated circuit includes an optical switching circuit.

In Example 12, the subject matter of Example 11 optionally includes a second electronic integrated circuit disposed on the other side of the dielectric substrate and electrically coupled with the second photonic integrated circuit via a metal interconnect disposed through the dielectric substrate; and a third electronic integrated circuit disposed on the other side of the dielectric substrate and electrically coupled with the third photonic integrated circuit via a metal interconnect disposed through the dielectric substrate; wherein the first electronic integrated circuit and the third electronic integrated circuit are configured to communicate via an optical pathway established within the second photonic integrated circuit controlled by the second integrated circuit.

In Example 13, the subject matter of any one or more of Examples 8-12 optionally include wherein the optical waveguide disposed external to the dielectric substrate includes an optical fiber.

In Example 14, the subject matter of any one or more of Examples 8-13 optionally include wherein the electronic integrated circuit includes a computing processor configured to communicate with another computing processor using the first photonic integrated circuit.

In Example 15, the subject matter of any one or more of Examples 8-14 optionally include a planar microlens disposed on the one side of the dielectric substrate to couple light from the first optical waveguide into the external optical waveguide disposed external to the dielectric substrate.

In Example 16, the subject matter of any one or more of Examples 8-15 optionally include a third photonic integrated circuit disposed on the one side of the dielectric substrate, wherein the dielectric substrate includes: a first plurality of optical waveguides disposed on the dielectric substrate to optically couple the first photonic integrated circuit with the optical device; and a second plurality of optical waveguides disposed on the dielectric substrate to optically couple the optical device with the third photonic integrated circuit; and wherein the optical device comprises an optical switch that controllably switches connections between different pairs of optical waveguides between the first plurality of optical waveguides and the second plurality of optical waveguides; and wherein the optical switch is controlled by an electronic integrated circuit disposed on the other side of the dielectric substrate via a metal interconnect disposed through the dielectric substrate.

In Example 17, the subject matter of Example 16 optionally includes wherein the optical switch comprises at least one of a micro-electro mechanical system (MEMS) optical switch or a liquid crystal (LC) optical switch.

In Example 18, the subject matter of any one or more of Examples 8-17 optionally include a third photonic integrated circuit disposed on the one side of the dielectric substrate, wherein the dielectric substrate includes: a first plurality of optical waveguides disposed on the dielectric substrate to optically couple the first photonic integrated circuit with the second photonic integrated circuit; and a second plurality of optical waveguides disposed on the dielectric substrate to optically couple the second photonic integrated circuit with the third photonic integrated circuit; and wherein the second photonic integrated circuit comprises an optical switch that controllably switches connections between different pairs of optical waveguides between the first plurality of optical waveguides and the second plurality of optical waveguides; and wherein the optical switch is controlled by an electronic integrated circuit disposed on the other side of the dielectric substrate via a metal interconnect disposed through the dielectric substrate.

In Example 19, the subject matter of any one or more of Examples 8-18 optionally include an alignment ball disposed between the dielectric substrate and the first photonic integrated circuit, wherein the dielectric substrate includes an alignment notch disposed on the one side of the dielectric substrate to seat the alignment ball and the first photonic integrated circuit includes a corresponding alignment notch to seat the alignment ball to optically align a waveguide or microlens of the first photonic integrated circuit with a corresponding waveguide or microlens of the dielectric substrate.

Example 20 is a method of forming an interposer comprising a planar lightwave circuit, the method comprising: attaching a dielectric substrate to a redistribution layer (RDL) having a metal via coupled with an electronic integrated circuit on one side of the dielectric substrate; forming a metal interconnect within the dielectric substrate to pass through the dielectric substrate from the RDL on the one side of the dielectric substrate to a photonic integrated circuit on an other side of the dielectric substrate; forming an optical waveguide on the other side of the dielectric substrate along a plane parallel with a plane of a surface of the dielectric substrate; and coupling a photonic integrated circuit with the metal via within the dielectric substrate and the optical waveguide on the other side of the dielectric substrate.

In Example 21, the subject matter of Example 20 optionally includes filling space between the photonic integrated circuit and the other side of the dielectric substrate with index matching material.

In Example 22, the subject matter of any one or more of Examples 20-21 optionally include wherein the optical waveguide comprises silicon nitride.

In Example 23, the subject matter of any one or more of Examples 20-22 optionally include wherein attaching the dielectric substrate to the RDL comprises thinning a carrier wafer attached to the RDL.

In Example 24, the subject matter of any one or more of Examples 20-23 optionally include wherein the dielectric substrate comprises a silicon dioxide glass material.

In Example 25, the subject matter of any one or more of Examples 20-24 optionally include forming an alignment notch in the dielectric substrate; and aligning the alignment notch in the dielectric substrate with a corresponding alignment notch in the photonic integrated circuit using an alignment member that seats in the alignment notches in both the dielectric substrate and the photonic integrated circuit.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An interposer apparatus comprising:
   a dielectric substrate, wherein the dielectric substrate comprises silicon dioxide glass;
   an optical waveguide disposed on the dielectric substrate, to optically couple a photonic integrated circuit disposed on one side of the dielectric substrate with another photonic integrated circuit disposed on the dielectric substrate; and
   a metal interconnect disposed through the dielectric substrate to electrically couple the photonic integrated circuit disposed on the one side of the dielectric substrate with an electronic integrated circuit disposed on an other side of the dielectric substrate, the other side being opposite the one side.

2. The apparatus of claim 1, wherein the optical waveguide comprises an organic dielectric material.

3. The apparatus of claim 1, wherein the optical waveguide is configured to guide light in a direction parallel to a surface plane of the one side of the dielectric substrate.

4. The apparatus of claim 1, wherein the dielectric substrate includes an alignment notch disposed on the one side of the dielectric substrate to seat an alignment ball to align the dielectric substrate with the photonic integrated circuit, wherein the photonic integrated circuit includes a corresponding alignment notch to seat the alignment ball.

5. The apparatus of claim 1, wherein the optical waveguide includes a microlens to optically couple with a corresponding microlens of the photonic integrated circuit.

6. The apparatus of claim 1, further comprising an index matching material disposed between the photonic integrated circuit and the dielectric substrate.

7. An optoelectronic system comprising:
a first photonic integrated circuit;
a first electronic integrated circuit; and
a dielectric substrate disposed between the first photonic integrated circuit and the first electronic integrated circuit, the dielectric substrate layered with a redistribution layer (RDL), wherein the dielectric substrate comprises silicon dioxide glass, wherein the dielectric substrate includes:
a first optical waveguide disposed on the dielectric substrate to optically couple the first photonic integrated circuit disposed on one side of the dielectric substrate with at least one of a second photonic integrated circuit disposed on the one side of the dielectric substrate or an optical device disposed external to the dielectric substrate by guiding light in a direction parallel to a surface plane of an other side of the dielectric substrate, the other side being opposite the one side;
a metal interconnect disposed through the dielectric substrate to electrically couple the first photonic integrated circuit disposed on the one side of the dielectric substrate with the first electronic integrated circuit disposed on the other side of the dielectric substrate; and
a second optical waveguide disposed on the dielectric substrate to optically couple the first photonic integrated circuit with an external optical waveguide disposed external to the dielectric substrate.

8. The system of claim 7, further comprising the second photonic integrated circuit, wherein the first photonic integrated circuit includes a photonic transmitter circuit and the second photonic integrated circuit includes a photonic receiver circuit.

9. The system of claim 7, further comprising a third photonic integrated circuit disposed on the one side of the dielectric substrate, wherein the dielectric substrate includes a second optical waveguide disposed on the dielectric substrate to optically couple at least one of the first photonic integrated circuit and the second photonic integrated circuit with the third photonic integrated circuit.

10. The system of claim 9, wherein the first photonic integrated circuit includes a photonic transmitter circuit, the third photonic integrated circuit includes a photonic receiver circuit, and the second photonic integrated circuit includes an optical switching circuit.

11. The system of claim 10, further comprising:
a second electronic integrated circuit disposed on the other side of the dielectric substrate and electrically coupled with the second photonic integrated circuit via a metal interconnect disposed through the dielectric substrate; and
a third electronic integrated circuit disposed on the other side of the dielectric substrate and electrically coupled with the third photonic integrated circuit via a metal interconnect disposed through the dielectric substrate;
wherein the first electronic integrated circuit and the third electronic integrated circuit are configured to communicate via an optical pathway established within the second photonic integrated circuit controlled by the second integrated circuit.

12. The system of claim 7, further comprising a planar microlens disposed on the one side of the dielectric substrate to couple light from the second optical waveguide into the external optical waveguide.

13. The system of claim 7, wherein the first electronic integrated circuit includes a computing processor configured to communicate with another computing processor using the first photonic integrated circuit.

14. The system of claim 7, further comprising a third photonic integrated circuit disposed on the one side of the dielectric substrate, wherein the dielectric substrate includes:
a first plurality of optical waveguides disposed on the dielectric substrate to optically couple the first photonic integrated circuit with the optical device; and
a second plurality of optical waveguides disposed on the dielectric substrate to optically couple the optical device with the third photonic integrated circuit; and
wherein the optical device comprises an optical switch that controllably switches connections between different pairs of optical waveguides between the first plurality of optical waveguides and the second plurality of optical waveguides; and
wherein the optical switch is controlled by an electronic integrated circuit disposed on the other side of the dielectric substrate via a metal interconnect disposed through the dielectric substrate.

15. The system of claim 14, wherein the optical switch comprises at least one of a micro-electro mechanical system (MEMS) optical switch or a liquid crystal (LC) optical switch.

16. The system of claim 7, further comprising a third photonic integrated circuit disposed on the one side of the dielectric substrate, wherein the dielectric substrate includes:
a first plurality of optical waveguides disposed on the dielectric substrate to optically couple the first photonic integrated circuit with the second photonic integrated circuit; and
a second plurality of optical waveguides disposed on the dielectric substrate to optically couple the second photonic integrated circuit with the third photonic integrated circuit; and
wherein the second photonic integrated circuit comprises an optical switch that controllably switches connections between different pairs of optical waveguides between the first plurality of optical waveguides and the second plurality of optical waveguides; and
wherein the optical switch is controlled by an electronic integrated circuit disposed on the other side of the dielectric substrate via a metal interconnect disposed through the dielectric substrate.

17. The system of claim 7, further comprising an alignment ball disposed between the dielectric substrate and the first photonic integrated circuit, wherein the dielectric substrate includes an alignment notch disposed on the one side of the dielectric substrate to seat the alignment ball and the first photonic integrated circuit includes a corresponding alignment notch to seat the alignment ball to optically align a waveguide or microlens of the first photonic integrated circuit with a corresponding waveguide or microlens of the dielectric substrate.

* * * * *